United States Patent
Wagner et al.

(10) Patent No.: US 6,652,017 B2
(45) Date of Patent: Nov. 25, 2003

(54) MULTI-PART COVER FOR THE STORAGE SPACE OF A VEHICLE ROOF

(75) Inventors: Tobias Wagner, Hamburg (DE); Thorsten Schumacher, Kummerfeld (DE); Jörg Brettmann, Sottrum (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 81 days.

(21) Appl. No.: 10/112,601

(22) Filed: Mar. 16, 2002

(65) Prior Publication Data

US 2002/0149227 A1 Oct. 17, 2002

Related U.S. Application Data

(63) Continuation-in-part of application No. PCT/EP01/06608, filed on Jun. 12, 2001.

(30) Foreign Application Priority Data

Jul. 26, 2000 (DE) .......................................... 100 36 223

(51) Int. Cl.[7] .................................................. B60J 7/20
(52) U.S. Cl. .................................. 296/107.08; 296/136
(58) Field of Search ............................. 296/107.08, 136

(56) References Cited

U.S. PATENT DOCUMENTS 4,799,729 A    1/1989   Muscat 5,921,608 A    7/1999   Schmitt et al.

FOREIGN PATENT DOCUMENTS

| DE | 39 39 145   | 5/1991  |
| DE | 197 12 967  | 10/1998 |
| DE | 197 49 552  | 5/1999  |
| DE | 297 21 430  | 5/1999  |
| DE | 297 21 663  | 5/1999  |
| DE | 298 12 165  | 6/1999  |
| DE | 298 04 385  | 8/1999  |
| DE | 198 10 616  | 9/1999  |
| EP | 0 302 963   | 8/1987  |

*Primary Examiner*—Joseph D. Pape
(74) *Attorney, Agent, or Firm*—Klaus J. Bach

(57) ABSTRACT

In a multi-part cover for a storage space of a roof in the rear of a vehicle, which cover comprises a center part and side parts pivotally connected to the center part, a common operating mechanism for operating the parts of the cover depending on the position of the roof is provided with a coupling between a roof operating linkage and a cover operating linkage whereby the roof operating linkage can be uncoupled from the cover operating linkage when the roof is deposited in the rear storage space for permitting longitudinal movement of the cover into an end position, in which it covers the roof in the storage space and the side parts of the cover are pivoted outwardly from the center part of the cover.

19 Claims, 16 Drawing Sheets

MULTI-PART COVER FOR THE STORAGE SPACE OF A VEHICLE ROOF

This is a Continuation-In-Part application of international application PCT/EP01/06608 filed Jun. 12, 2001 and claiming the priority of German application 100 36 223.0 filed Jul. 26, 2000.

BACKGROUND OF THE INVENTION

The invention relates to a multi-part cover for a storage space of a roof in the rear of a vehicle. The cover comprises a center part and side parts which, in the closed position of the cover, are disposed adjacent the center part. The invention is particularly concerned with a common drive for the center part and the side parts which drive is controlled depending on the cover position.

It is known to deposit foldable vehicle roofs in a rear storage space of the vehicle when the vehicle roof is open, and to cover the storage space by a cover including a center part extending in a direction transverse to the vehicle longitudinal axis and by side parts disposed adjacent thereto (DE 39 39 145 A1). The side parts are associated with an area, which extends sidewardly from the center part and in which the roof side-posts and the operating linkage are disposed when the roof is closed. Accordingly the side parts must be removed from their cover position when the roof is closed while for the center part only a longitudinal displacement with respect to the closed and open positions of the roof is necessary since, with the roof open and deposited in the storage space, the roof storage space is to be fully covered. With the roof closed, the roof is removed from the rear storage compartment and the center part is moved toward the front.

This requires for the opening and closing procedure of the roof a number of adjustment movements of the roof and also of the cover and, if the cover comprises separate side parts, for the center part and for the side parts.

An arrangement is therefore provided in which the side parts are supported on the vehicle body at their, with respect to a transverse vehicle direction, inner area so as to be pivotable about a vertical axis. They are coupled with the center part so that the side parts are pivoted into a parallel plane with the center part when the center part is displaced longitudinally from its rear cover position, which it assumes when the roof is open, to a front position which it assumes when the roof is closed. On the sides of the center part and behind the center part sufficient space is provided for moving the roof into its closed position. Separate drives are provided for the roof and for the cover; only the drive mechanisms for the rel. movement of the cover parts are interconnected.

In another design (DE 197 49 552 A1) of a cover for a folding roof stored in a rear storage compartment of a vehicle the side parts are hinged to the center part so as to pivot about pivot axes which extend parallel to the side edges of the center part which extend in the travel direction of the vehicle. The center part and the side parts are hood-like tilted relative to each other adjacent the inner edges of the roof storage containment when the cover is in a position providing access to the roof storage containment. An automatic drive arrangement is provided for pivoting the side parts together with the center part with an intermediate telescopic element serving as a control element.

DE 197 12 967 A1 discloses a cover for the storage compartment of folding vehicle roofs which cover consists of a center part and side parts. It includes separate operating drives for the folding vehicle roof and the parts of the cover, that is the center part and the side parts, which are interconnected by way of a joint having a pivot axis extending normal to the center part such that the side part can be pivoted inwardly under the center part.

DE 298 04 385 U1 and the corresponding DE 198 10 616 A1 disclose a multi-part cover including a center part, which is pivotable about a momentary axis, that extends in a transverse vehicle direction, and side parts, which are pivotable each about a longitudinal vehicle axis out of their positions at the sides of the center part downwardly into a vertical position. The pivot axes of the side parts are pivotable into an upward position about a transverse axis which is stationary with respect to the center part. With such an arrangement, a roof storage compartment cover is to be obtained which is small and can be easily manufactured and installed.

U.S. Pat. No. 4,799,729 and EP 0 302 963 B1 discloses a multi-part cover for the storage space of a roof wherein the center part of the cover is formed by the angled leg of a rear wall of the vehicle interior which is pivotable inwardly and wherein the side parts, which are supported on the vehicle body pivotally about a vertical axis, abut the center part sides when the cover is closed. For opening the cover, the center part is raised by pivoting the rear wall and the side parts are pivoted inwardly below the center part about hinges mounted on the rear wall.

Finally DE 297 21 430 U1 discloses a multi-part cover for the storage space of a roof in the rear of a vehicle, which includes a center part and side parts, which, in a closed position of the cover with the roof disposed in the storage compartment, are disposed at opposite sides of the center part. The side parts are connected to the roof and are pivotable about pivot axes which arranged at the roof frame parts in the area of the front support that is along axes which extend in the longitudinal vehicle direction. With the roof closed, the side prts are pivoted below the cover and, with the roof open and disposed in the storage compartment, they are disposed adjacent the center part. The side parts are coupled to the cover frame and movable together therewith. Their movement between an inwardly pivoted position below the center part when the roof is closed and their outwardly pivoted position when the roof is in the storage compartment is controlled depending on the movement of the roof.

Additional multi-part covers for the storage compartment of a roof in the rear of a vehicle are known for example from U.S. Pat. Nos. 2,599,277, 2,959,477, 2,959,447 and 2,992,042.

It is the object of the present invention to provide a multi-part cover for a vehicle roof storage compartment with an automatic operating mechanism for the roof and the cover including center part and side parts, which does not require complicated controls.

SUMMARY OF THE INVENTION

In multi-part cover for the storage space of a roof in the rear of a vehicle which cover comprises a center part and side parts pivotally connected to the center part, a common operating mechanism for operating the parts of the cover depending on the position of the roof is provided with a coupling between the roof operating linkage and the cover operating linkage whereby the roof linkage can be uncoupled from the cover operating linkage when the roof is deposited in the rear storage space for permitting longitudinal movement of the cover into an end position in which it covers the storage space and the side parts of the cover are pivoted outwardly from the center part of the cover.

The movements of roof and the cover consisting of the center part and side parts pivotally connected to the center part are controlled by a mechanical coupling mechanism by which the movement sequences are predetermined so that no additional control steps are necessary.

The drive for the longitudinal displacement of the center part from which the movement of the side parts is derived is actuated after the insertion of the roof into the roof storage compartment.

A mechanically simple design for moving the roof and the respective cover provides, in accordance with the invention for a pivot support arrangement of the center part of the cover whereby it is pivotable between a horizontal cover position and an open position in which it is pivoted by about 90° out of the cover position and also a pivot movement providing for a longitudinal displacement of the center part while in an essentially horizontal position. This is achieved in that the center part is pivotable with regard to the roof guide structure about different pivot axes, which are displaced with respect to the plane of the center part toward the same side but differently spaced therefrom. The pivot axis, which is farther away from the center part, is stationary when the roof is deposited in the storage compartment. The center part is displaceable about the stationary pivot axis toward the rear of the stored roof.

For the connection of the joint to the center part, which forms the core piece of the cover and which also serves as a storage shelf, one joint half is mounted to the center part and the other joint half is connected, bay way of the drive parts for the side parts, to the roof. In this way, a simple drive connection is provided whereby the respective side part is pivotable relative to the center part depending on the longitudinal displacement of the center part when the roof is in the storage position.

With such an arrangement, the part of the joint, which is connected to the center part, can determine the position of the respective side part depending on the pivot angle in a simple manner. With the guide structure, the position of the side parts relative to the center part regarding their height transverse to the center part and the angular position of the plane of the center part relative to the plane of the side parts is determined. A stable large area support with a flat arrangement can be achieved by providing for the guide structure radially opposite guide slots for a guide pin of the joint which is stationary relative to the center part.

These guide structures are preferably associated with a guide cylinder which surrounds the guide pin so that the joint half, which is part of the drive connection, is pivotable by guidance of the guide pin by means of guide arms, which are disposed opposite each other and extend radially into the guide slots and are pivotable in a position-dependent manner.

The invention will become more readily apparent from the following description of an embodiment thereof on the basis of the accompanying drawings.

DESCRIPTION OF A PREFERRED EMBODIMENT

Figure 1:
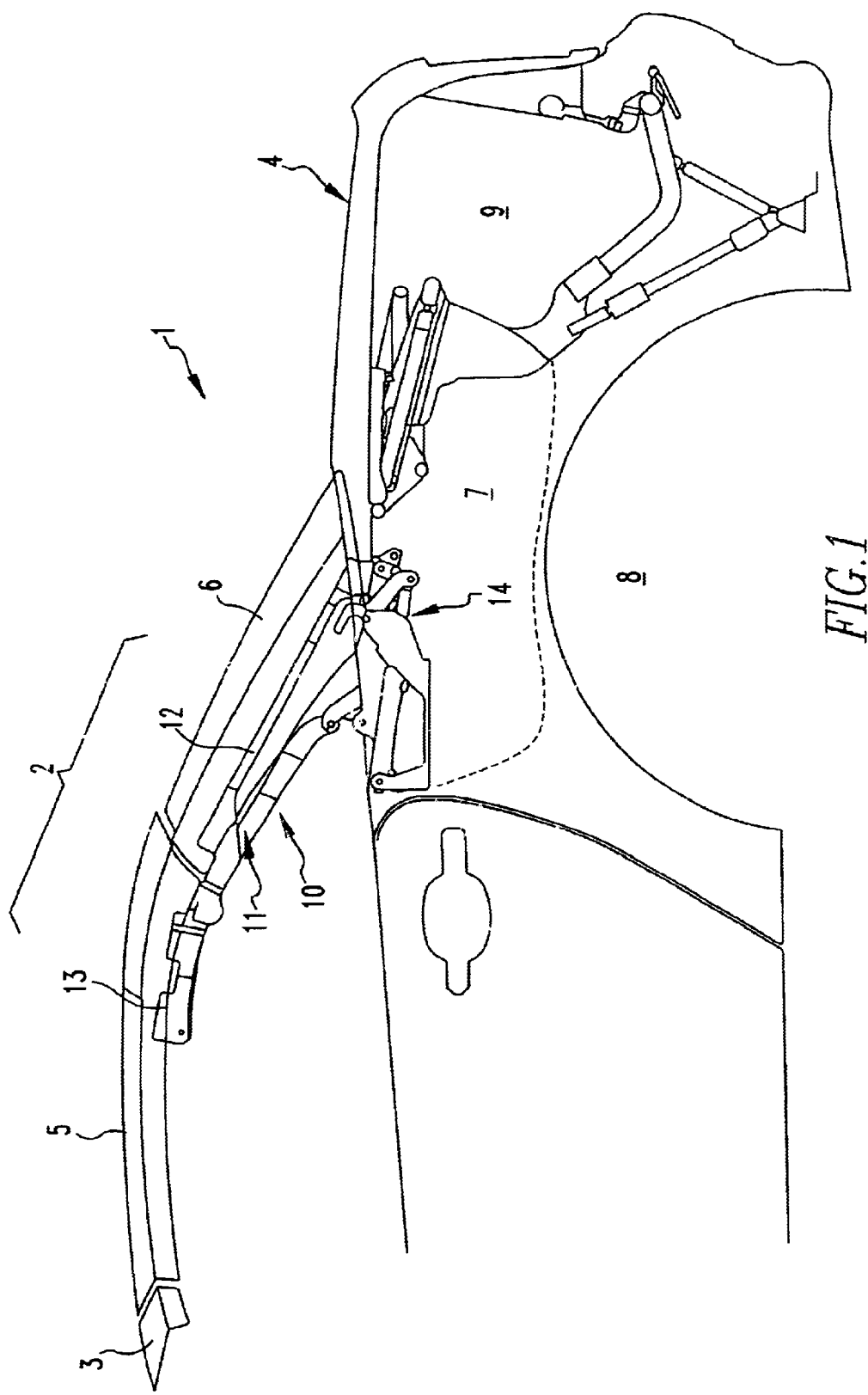
FIG. 1 is a schematic view of a section of a vehicle with a foldable roof showing the basic operating mechanism for the roof.

FIG. 1 is a schematic representation of the rear part of a vehicle 1, which includes a roof 2 that can be opened and which extends between a windshield frame 3 and a rear trunk lid 4. The roof 2 is a hardtop which includes a front part 5 adjacent the windshield frame 3 and a rear window part 6. The front part 5 and the rear window part 6 of the roof can be moved into a roof storage compartment 7 when the roof is to be opened, which storage compartment 7 is disposed essentially above the wheel well 8 between the vehicle interior and the trunk 9. A part of the trunk is also used to accommodate the roof 2.

The operating structure for the roof front part 5 and the rear window part 6 is a positive guide structure and is formed by a four-link operating mechanism 10 which is shown only schematically. It comprises of front control link 11, a rear control link 12 and a coupling 13. The control links 11, 12, of which the control link 11 is a double arm lever, are pivotable about pivot axes, which are stationary with respect to the vehicle body. The same operating mechanisms are provided at opposite sides of the vehicle 1 interconnected by the roof top part 5 and the rear window part 6. They include each a drive element 14, which is shown to be an operating cylinder.

When the roof, which may be in the form of a soft top (rug top) is deposited in the roof storage compartment 7, the movement of the four-link operating mechanism 10 causes the rear window part to be disposed upside down in the storage compartment that is the inner side, which faces the passenger compartment when the roof is closed, is disposed on top and is covered by the front roof part 5, which is in its normal orientation, that is with its outer roof skin facing upwardly.

The movement of the roof 2 into, or respectively out of, the roof storage compartment 7 requires that the storage compartment is open. In the example of FIG. 1 the roof storage compartment 7 is shown covered partially by the trunk lid 4 with the trunk lid closed. It is also covered partially by a cover, which is not shown in FIG. 1. In FIGS. 2 to 9, this cover is designated by the numeral 19. However, only the center part 50 of the cover is shown, which is represented as a shelf because, as far as the closed roof 2 is concerned, this center part 50 covers the open space between the rear wall of the vehicle interior and the rear window part 6 together with the side parts 51 disposed at opposite sides of the center part 50. With respect to the arrangement as shown in FIG. 1 this means that, with the roof 5 disposed in the storage compartment 7, there is a gap between the cover 19 (as positioned when the roof 2 is closed) and the closed trunk lid 4, which gap must also be covered. For this purpose, the cover 19 is longitudinally movable. The longitudinal movement occurs in connection with the opening and closing of the cover 19 as it is necessary for moving the roof 2 into, and out of, the roof storage compartment 7. Further details and features of the cover design according to FIG. 1, which is essentially known, are disclosed in DE 44 45 580 C1.

For an explanation of the invention and an understanding of the control mechanism for the cover 19 reference is made to FIGS. 2 to 15. As shown therein, the cover 19 is positively coupled with the roof 2 and is moved along with the pivoting of the roof 2. For the roof 2 and the cover 19, a common drive is provided. The drive operates in one direction at a time, the operation in opening direction being opposite to that in the closing direction. Operation of the drive during either the opening or the closing procedure is continuous.

Figure 2:
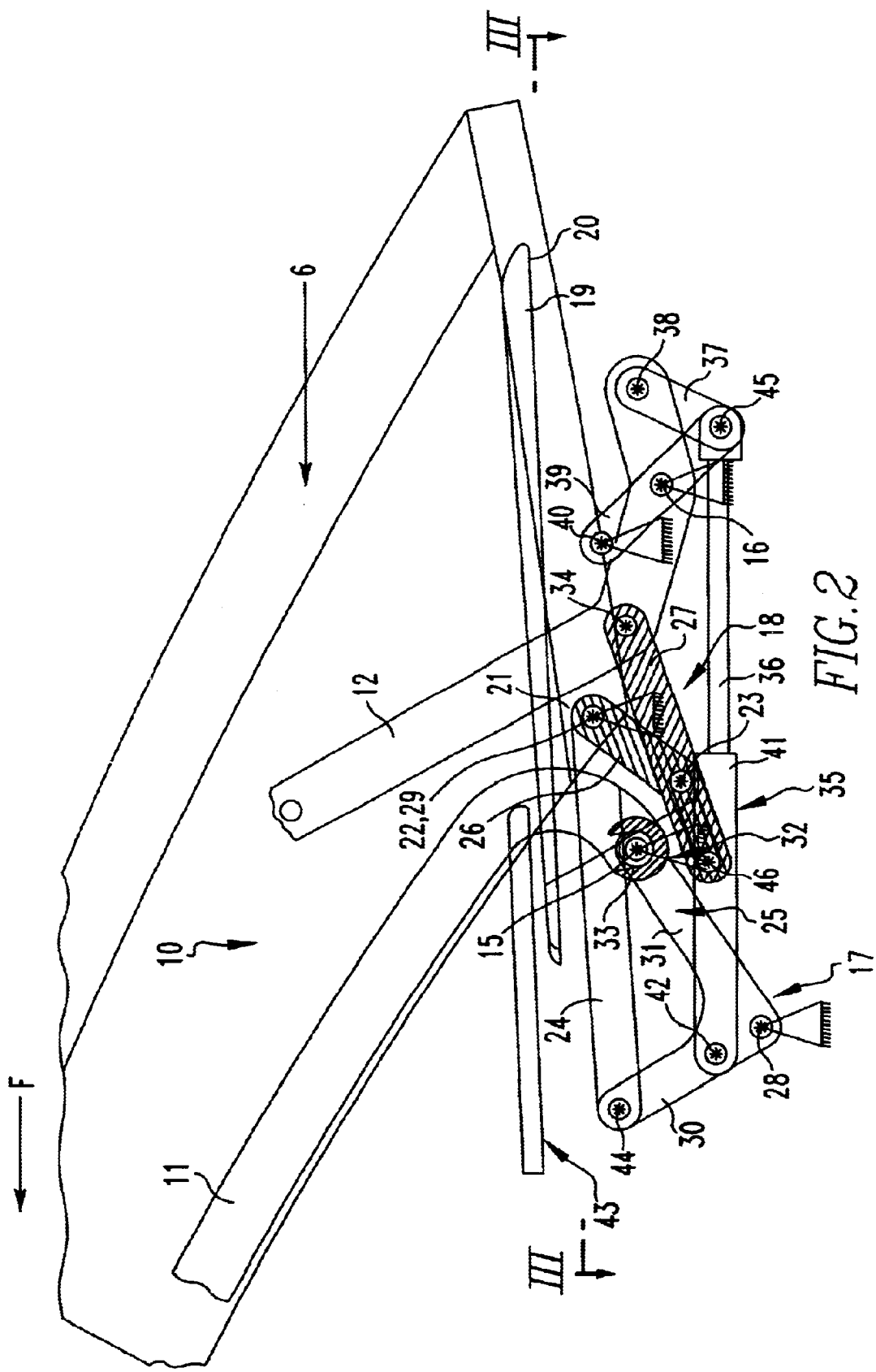
FIG. 2 is a simplified schematic side view of an operating mechanism for the cover of a roof to be deposited in a roof storage compartment wherein only the center part of the cover, which consists of a center part and side parts attached thereto, is shown. The arrangement is shown with a partially simplified operating mechanism for a roof cover in the form of a hardtop, which is in a closed position.

FIG. 2 shows only the front control link 11 and the rear control link 12 of the four-link operating mechanism for the roof 2. Of the roof only the rear window part 6 is schematically shown. As shown in the schematic representation of FIG. 2 the front and rear control links 11 and 12, which are part of four-link operating mechanism and arranged symmetrically at opposite sides of the vehicle, are pivotally supported on the vehicle body. The pivot axis for the front control link 11 is indicated by the reference numeral 15 and the pivot axis of the rear control link 12 is indicated by the reference numeral 16.

Figure 9:
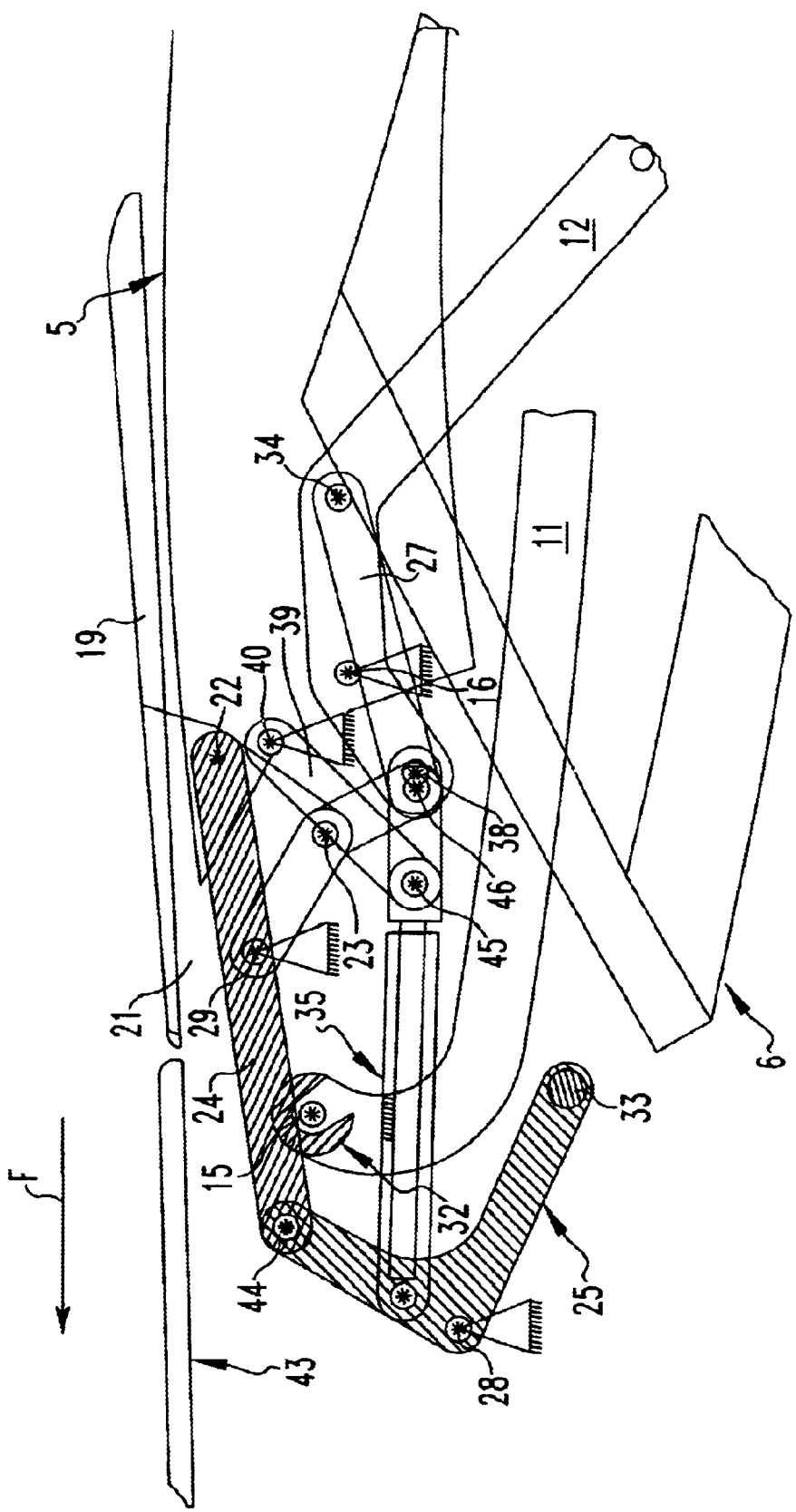
FIG. 9 shows the end position of the cover—shown for the center part—wherein in accordance with FIG. 2 the cover extends over the access to the storage compartment for the stored roof.

Coupled to the control links 11 and 12 are guide link 17 and 18, which control the movement of the cover 19. In FIG. 2, only the center part 50 of the cover 19 is shown in a closed forward position corresponding to the closed vehicle roof 2. Of the vehicle roof 2, only the rear window part 6 is shown whose side edges form the C-columns of the vehicle when the roof 2 is closed. The respective second closing position of the cover 19 is shown in FIG. 9. A comparison of FIGS. 2 and 9 shows that, in the second closing position of the cover 19 in which the roof 2 is open and deposited in the storage compartment 7, the cover 19 is in a rearwardly displaced closing position. In this second closing position, the cover 19 covers the gap in the access to the roof storage compartment 7, which is covered by the rear window part 6 when the roof is closed.

Figure 3:
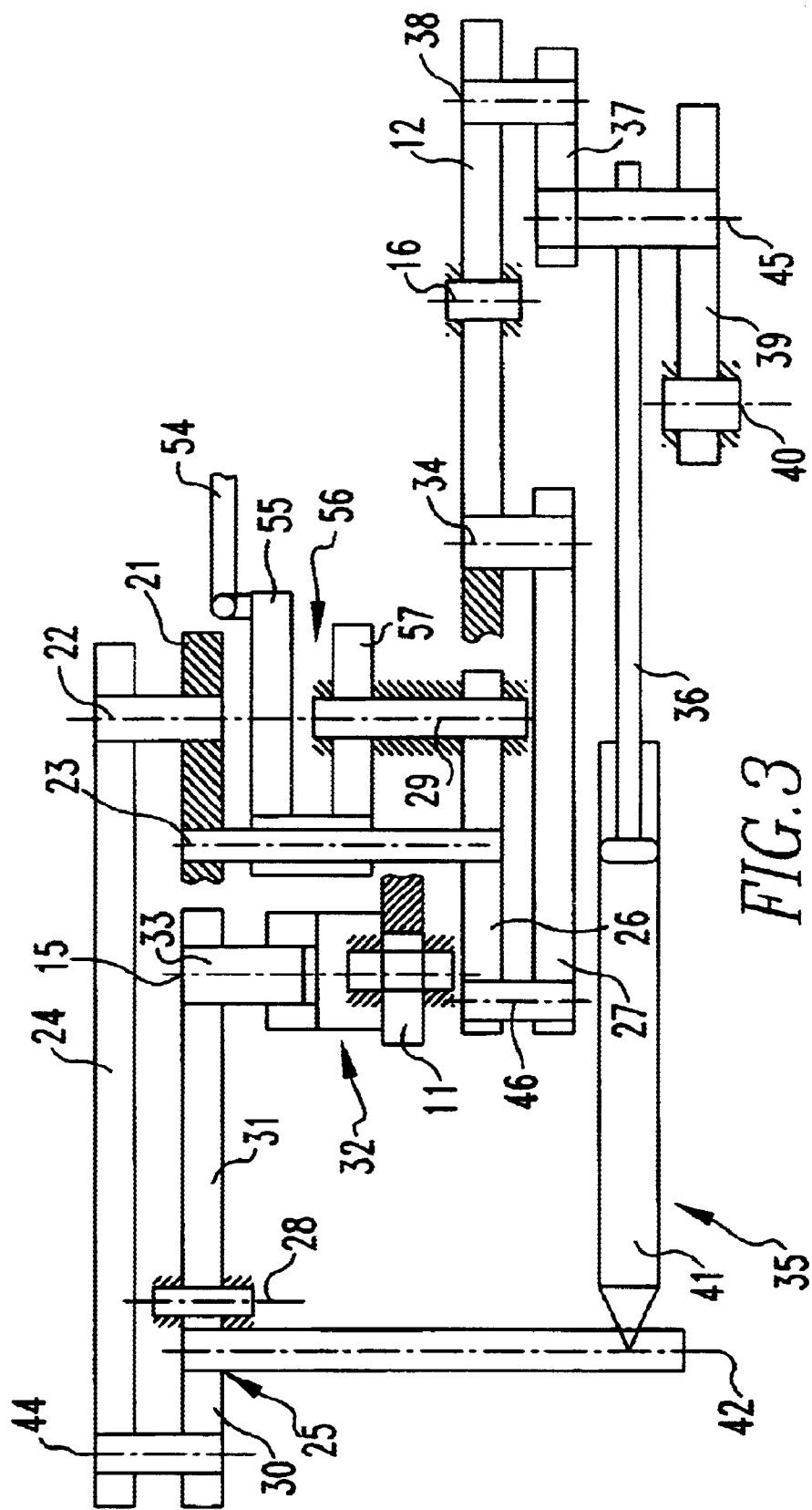
FIG. 3 shows, in a cross-sectional view, schematically and somewhat modified to clearer present the operation, the operating mechanism for the cover as seen along the cross-section III—III of FIG. 2.
Figure 4:
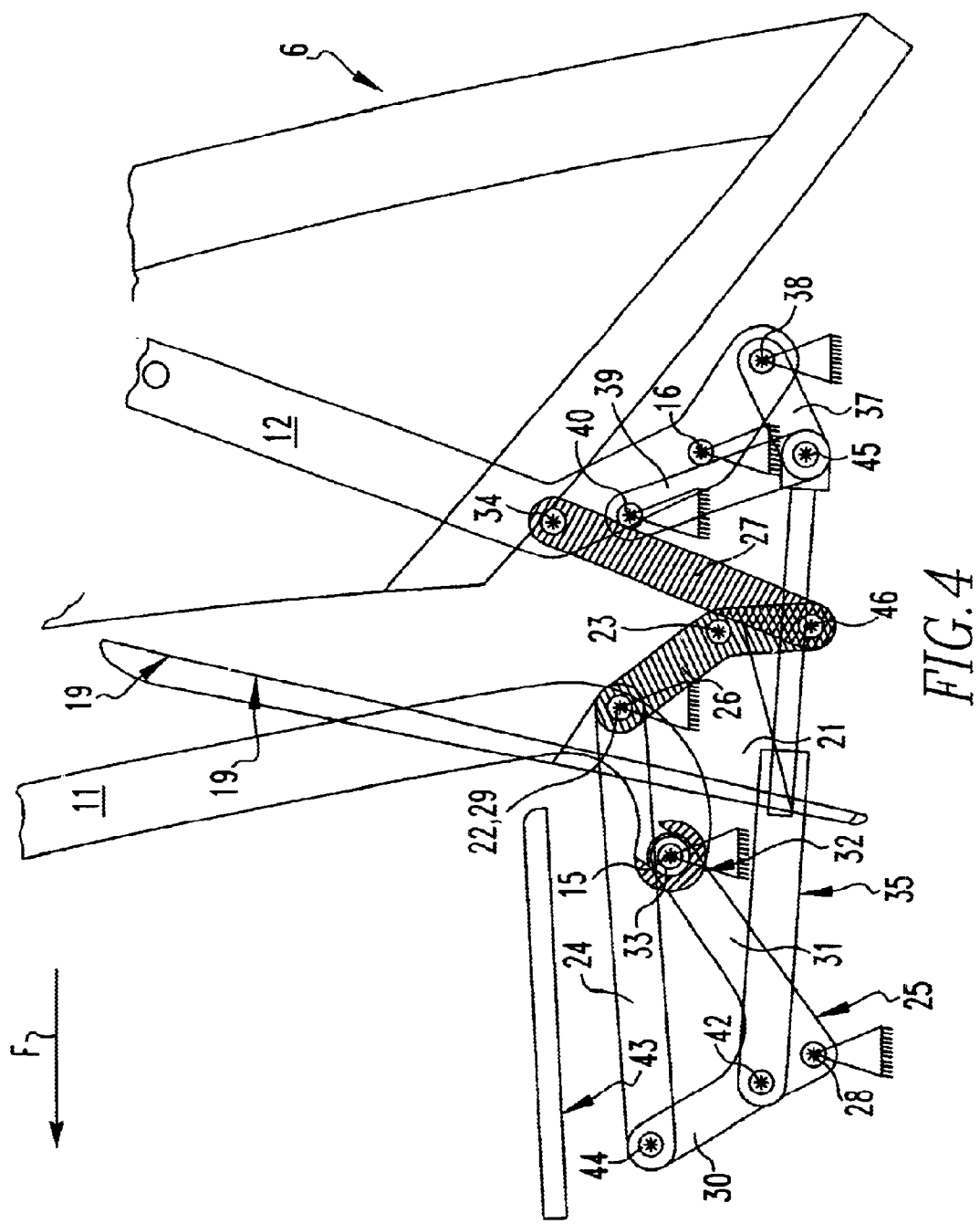
Figure 5:
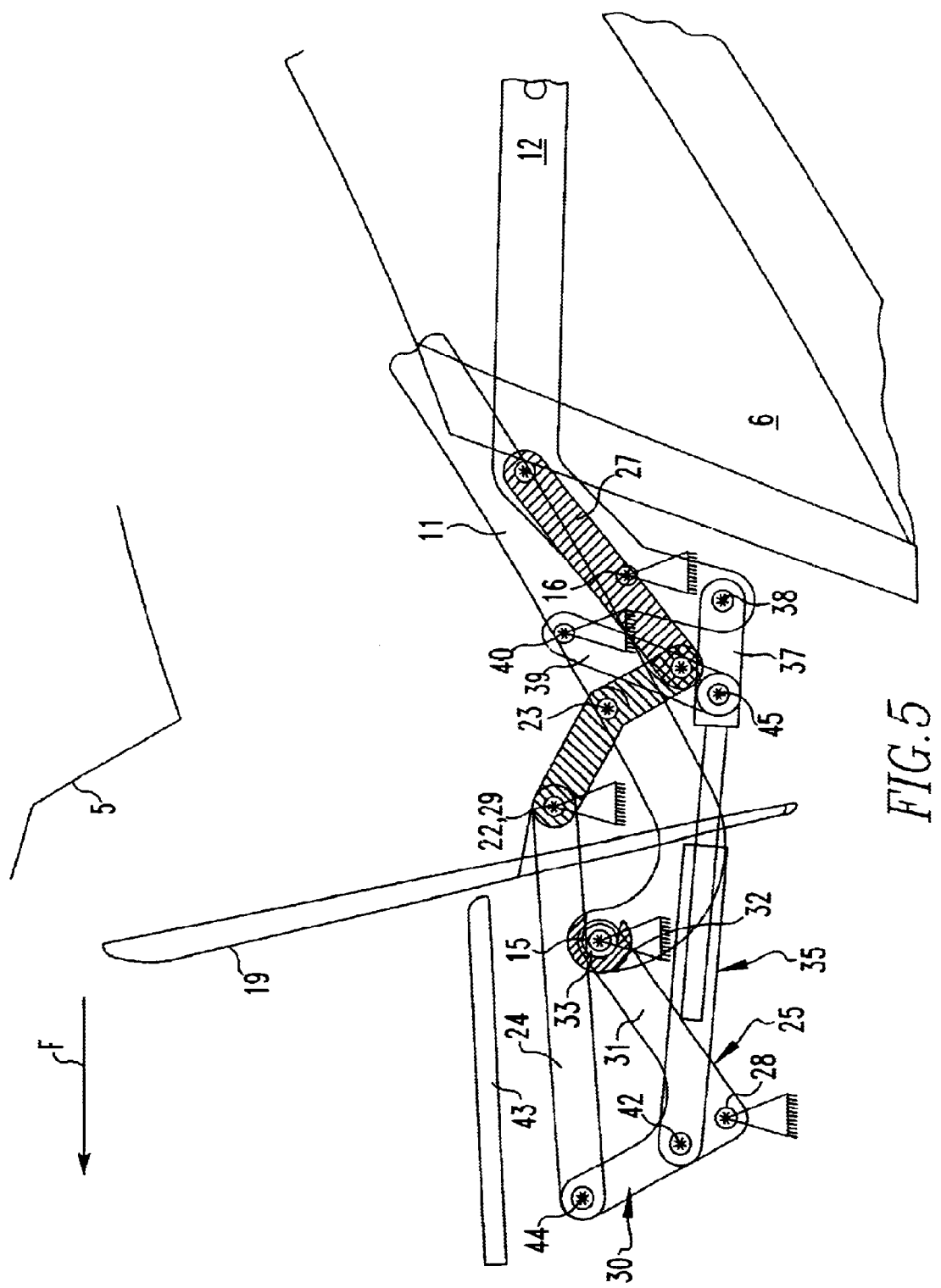
FIG. 5 shows another transition phase, subsequent to that shown in FIG. 4, during opening of the roof wherein the front roof part moves past the open cover.

Below, the basic arrangement of the guide linkages 17, 18 in coordination with the cover 19 is described on the basis of FIGS. 2 to 9. The drive for and the arrangement and control of the side parts 51 is not taken into consideration. FIG. 3 shows how the individual levers and links of the operating mechanism linkages 17 and 18 and the four-link drive 10 cooperate to operate the cover 19. Arranged in front of the cover 19—in the transition area to the vehicle interior—is a lining 43, under which the cover 19 partially extends in its first closing position (FIG. 2).

When in a closed position the center part 50 of the cover 19 is provided at its underside 20, that is the side facing the roof storage compartment 7, with a console 21 which, at different distances from the underside 20 of the center part 50, is provided with a first control point 22 and a second control point 23. At the first control point 22, the front guide linkage 17 is connected to the console 21 and at the second control point, the guide link 18 is connected to the console 21. The guide linkages 17 and 18 are each formed by a pair of levers, the levers of the guide linkages 17 being designated by the numerals 24 and 25, and the levers of the guide linkage 18 being designated by the numerals 26 and 27. Of the levers 25, 24 and 26, 27 of each linkage 17 and 18 one is pivotally supported by the vehicle body, that is the lever 25 for the linkage 17 and the lever 26 for the linkage 18. The pivot axes of the vehicle body connecting locations are designated by the reference numerals 28 and 29.

Of the levers 24 and 25, the lever 25 is an angular lever and is pivotable about the pivot axis 28 such that its arms 30 and 31 are inclined upwardly in opposite directions. The rear lever arm 31, with respect to the longitudinal axis of the vehicle—the forward direction is indicated in FIG. 2 by the arrow F—is engaged, when the roof is closed, in its initial position by a catch member 32 of the front guide link 11 so that it is concentric with the pivot axis 15 of the guide link 11. The catch member 32 receives a pin 33, which projects sidewardly from the lever arm 31 (see FIG. 3) and is upwardly open so that the arm 31 cannot pivot downwardly. At the free end of the other arm 30 of the lever 25, the lever 24 is supported pivotally about a pivot axis 44. In the initial position shown, the lever 24 extends essentially parallel to the plane of the cover 19 and, extending over the arm 31, is connected to the console 24 of the storage shelf of the cover 19.

This first control point 22 is disposed in the initial position as shown in FIG. 2 co-axially with the pivot axis 29 of the lever 26 of the guide linkage 18, which is stationary with regard to the vehicle body and which, in its center area, is connected by a second control joint 23 to the console 21. At the other end of the lever 26, the lever 27 is pivotally connected thereto at the point 46. The lever 27 again is connected to the rear control link 12 by a rotary joint 34.

The rear control link 12 is actuated by the drive structure 35, which operates the roof 2 and also the cover 19 and which is formed by an operating cylinder 41. The hydraulically or pneumatically operated operating cylinder 41 actuates, by way of its piston rod 36 and a four-link structure, the rear control link 12 to which it is linked by a connecting web 37. The connecting web 37 is pivotally connected at the point 38 to the rear end of the rear control link 12, which extends from the pivot axis 16. The connecting web 37 is rotatably supported by a support rod 39 by way of a pivot joint 40 co-axially with the connecting joint 45 of the piston rod 36.

At the opposite end, the drive structure 35 is supported with its operating cylinder 41 at the engagement point 42 on the arm 30 of the lever 25, which is kept stationary by being supported by the stationary pivot point 28 and the catch member 32 until, upon movement of the piston rod 36 into the cylinder 41 with a corresponding pivoting of the rear control lever 12 and the front control lever 11 in the direction toward the storage position of the roof 2 in the roof storage compartment 7, the front control lever 11 reaches a pivot position, in which the opening of the catch 32 extends about tangentially to a circle centered at the pivot axis 28 and extending through the pivot axis 15. Then, by the force generated by the drive structure 35, the lever 25 is moves the pin 33 of out the catch member 32.

Figure 6:
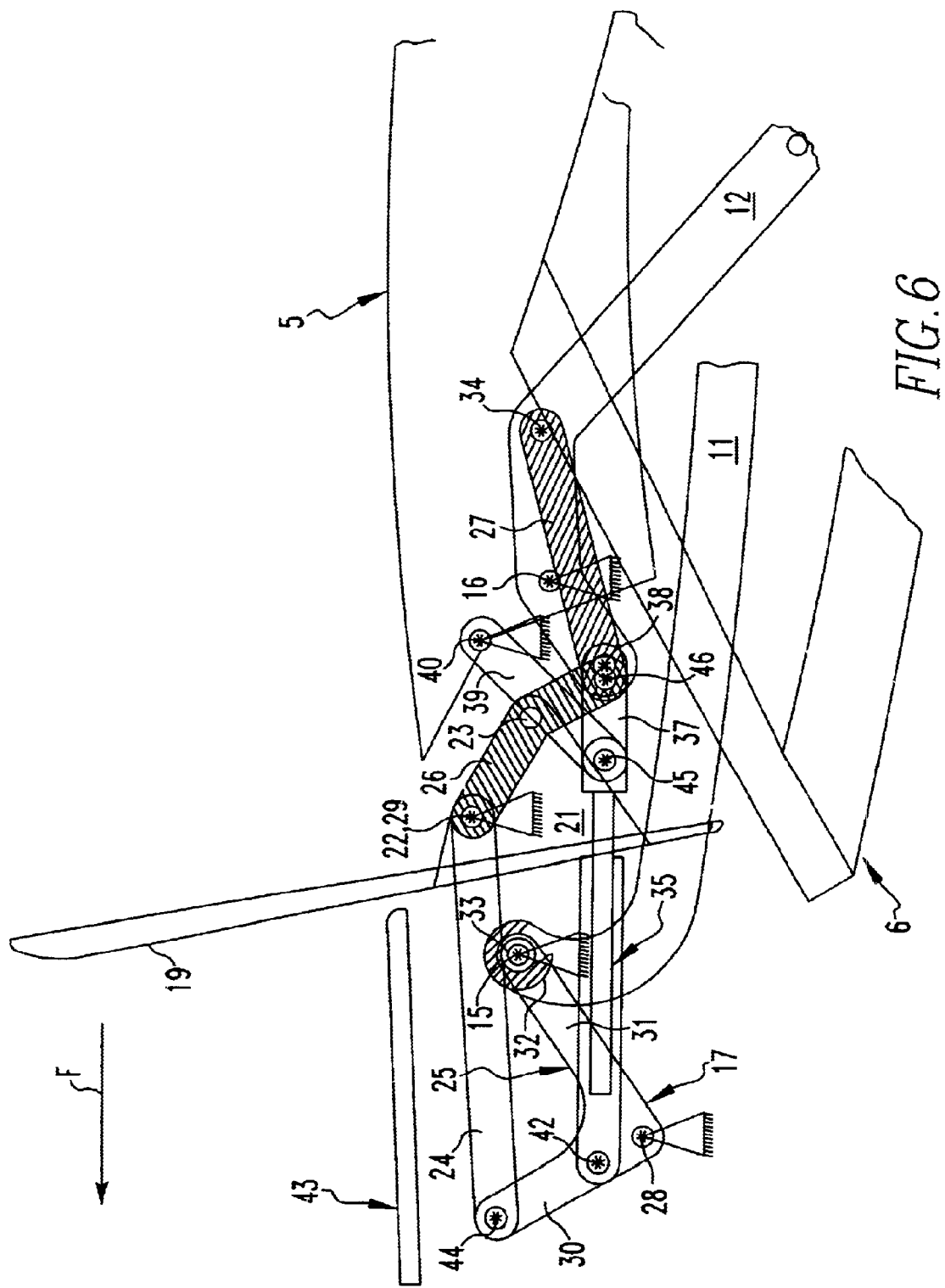
FIG. 6 shows still a further transition phase of the cover operating mechanisms wherein, like in a FIG. 2, only the drive mechanism elements are shown and the roof has reached its open end position in the roof storage compartment of the vehicle so that the cover can now be closed.

This release position which is shown in FIG. 6 corresponds to the end position of the roof 2 in the roof storage compartment 7. The mass forces of the roof 2 are effective in a direction toward this end position as soon as a certain point in the opening path of the roof 2 has been passed. In the storage compartment 7, the roof 2 is in an end position so that the roof 2, upon further pivoting of the cover 19 in closing direction—generating a tension force on the drive structure—maintains its end position while only the cover 19 is moved toward its second closing position. When the cover 19 is in its second closing position, both pivot partners—the cover 19 and the roof 2—are held in their end positions while the roof 2 is open. A stop is preferably also provided for the cover 19 or the respective guide linkage 17, which accurately defines the end position, which stop however is not shown herein.

With this arrangement, the fact that first control point 22 and the second control point 23 are at different elevations in combination with the alternate use of these control points as pivot axes, are utilized in the control of the rotational and pivot movements of the cover 19. By pivoting one of the control points, in this case, the control point 23 about the control point 22 as pivot point, a start out position or pivot axis for the control point 23 can be provided which, with a displaced position of the second control point 23, which is obtained by pivoting about the first control point 22 and the utilization of the control point 23 as pivot axis results in a longitudinal displacement of the cover 19 and the tilting thereof.

Figure 7:
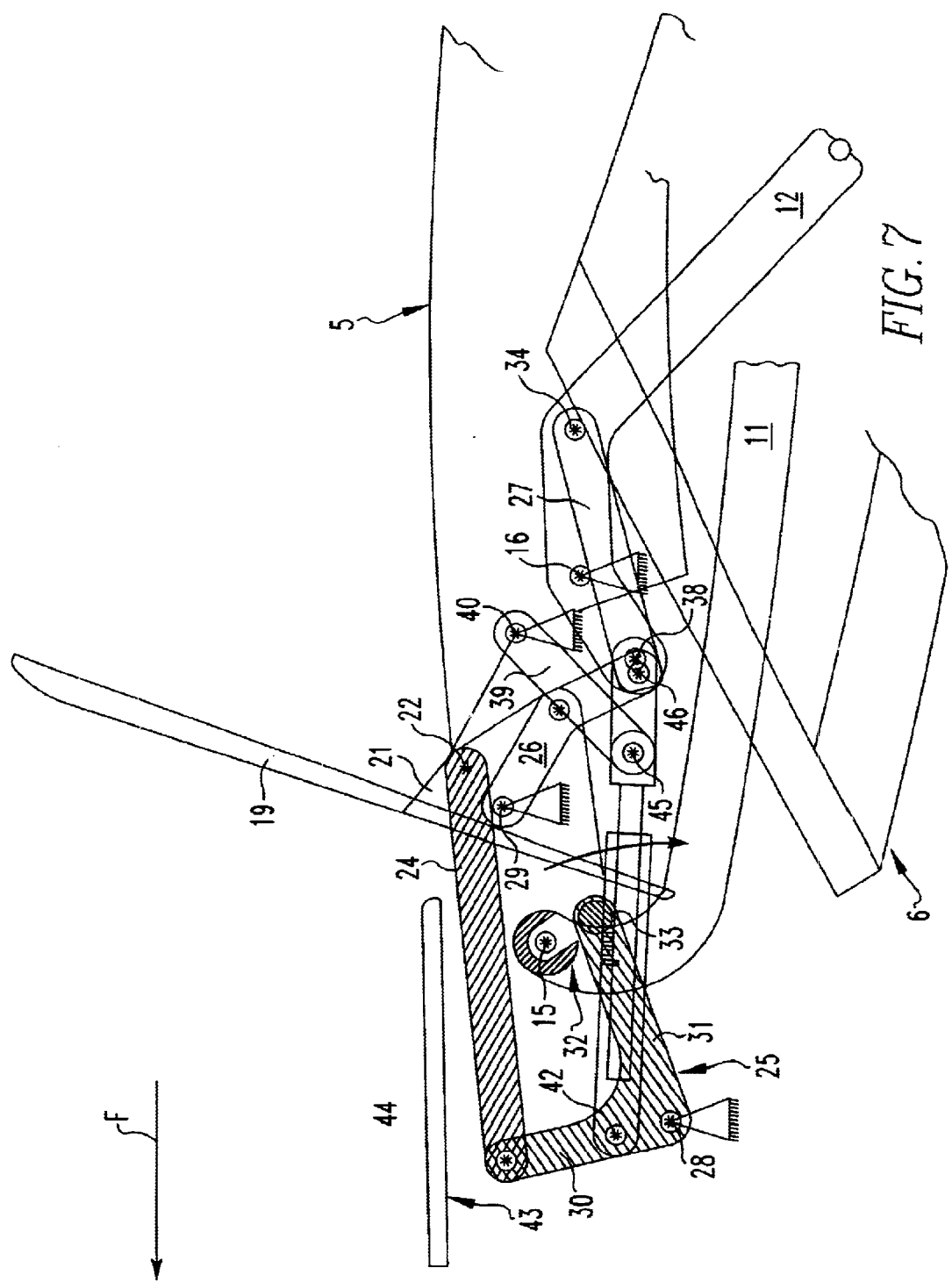
FIG. 7 shows the beginning stage of the closing movement of the cover according to FIG. 2 with the transfer of the cover, of which only the center part is shown, into its second closing position. The operating mechanism maintains its direction of operation and the cover operating mechanism is released from its locked position with regard to the roof operating mechanism.
Figure 8:
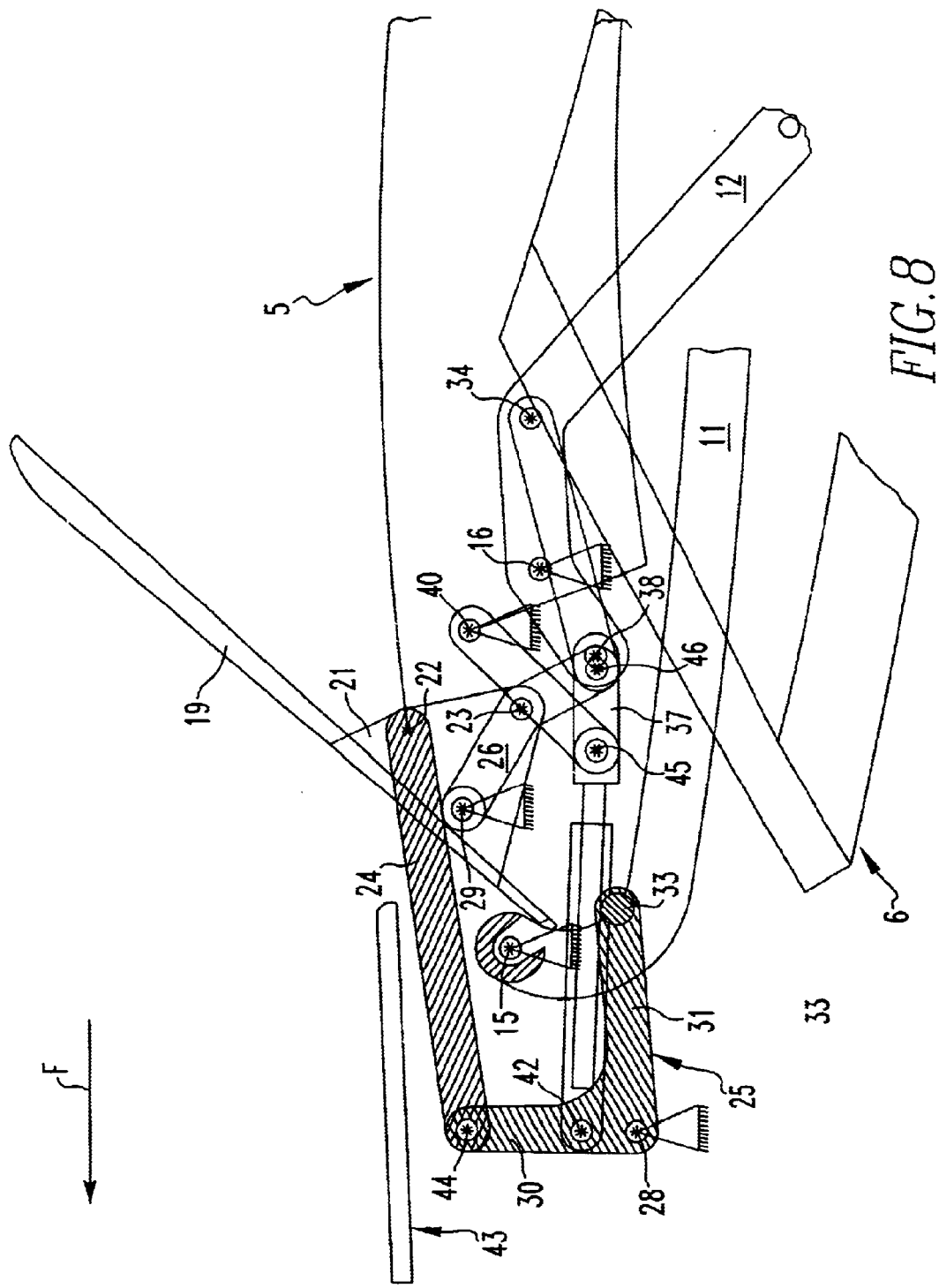
FIG. 8 shows another transition phase in the closing process of the cover according to FIG. 2 with the roof disposed in the storage compartment.

The respective operating sequence is shown in FIGS. 2–9. FIG. 9 shows the end position of the roof 2 in the roof storage compartment. When the closing of the roof 2 is initiated from this end position, the operating sequence is reversed. Upon extending the drive structure 35, the mass force of the roof first holds the roof in the storage compartment while the cover 19 is raised (FIG. 8). With further raising, the lever 25 of the guide linkage 17 is pivoted toward the catch member 32 (FIG. 7) of the front control lever 11, which is still in its lower rest position (FIG. 7). Finally the pin 33 enters the catch member 32, FIG. 6. Now the position of the guide linkage 17 as shown in FIGS. 6 to 2 is reached, wherein, by means of the guide linkage 17, the first control point 22 becomes the pivot axis about which the second control point 23 is pivoted by way of the lever 26 of the guide linkage 18. With further extension of the drive structure 35, the roof 2 is raised from the roof storage compartment 7 and is pivoted into the closing direction. In this stage, the closing movement of the roof 2 is ahead of the closing movement of the cover 19 with regard to the transfer thereof into the first closing position (FIG. 2).

As shown in the drawings, the invention provides a solution for a simple and relatively small operating mechanism for the roof 2 and the cover 19 with relatively simple means, wherein the drive structure 35 acts directly between elements of the roof and the cover operating mechanisms so that only relatively small forces are acting on the vehicle body when the roof and the cover are operated.

With regard to the invention, the dimensioning of the guide linkages 17 and 18 as well as their connections to the cover 19 are expedient as they are shown in the figures. The dimensioning is therefore important for the operation of the invention.

It is also very advantageous that the operating direction of the drive structure 35 is the same for the whole operating sequences during opening and also during closing of the roof 2 while the control for the cover 19 is integrated. The operating forces for the opening and closing of the roof 2 do not need to be taken up by the operating mechanism for the cover 19 although the drive structure 35 directly engages an element of this operating mechanism, that is, the lever 25 of the guide linkage 17.

In FIGS. 2 and 4 to 9, the cover 19 is shown as a single unit as it may be used for vehicles with a one-part cover that may also be employed as a shelf. In the following figures, a multi-part cover is shown. Such a cover comprises a center part 50 and side parts 51, which are disposed at opposite sides of the center part. They cover the area in which, with the roof closed, roof and linkage components corresponding to the C-pillar area are disposed when the roof 2 is disposed in the roof storage compartment 7 and the cover 19 is closed.

Figure 10:
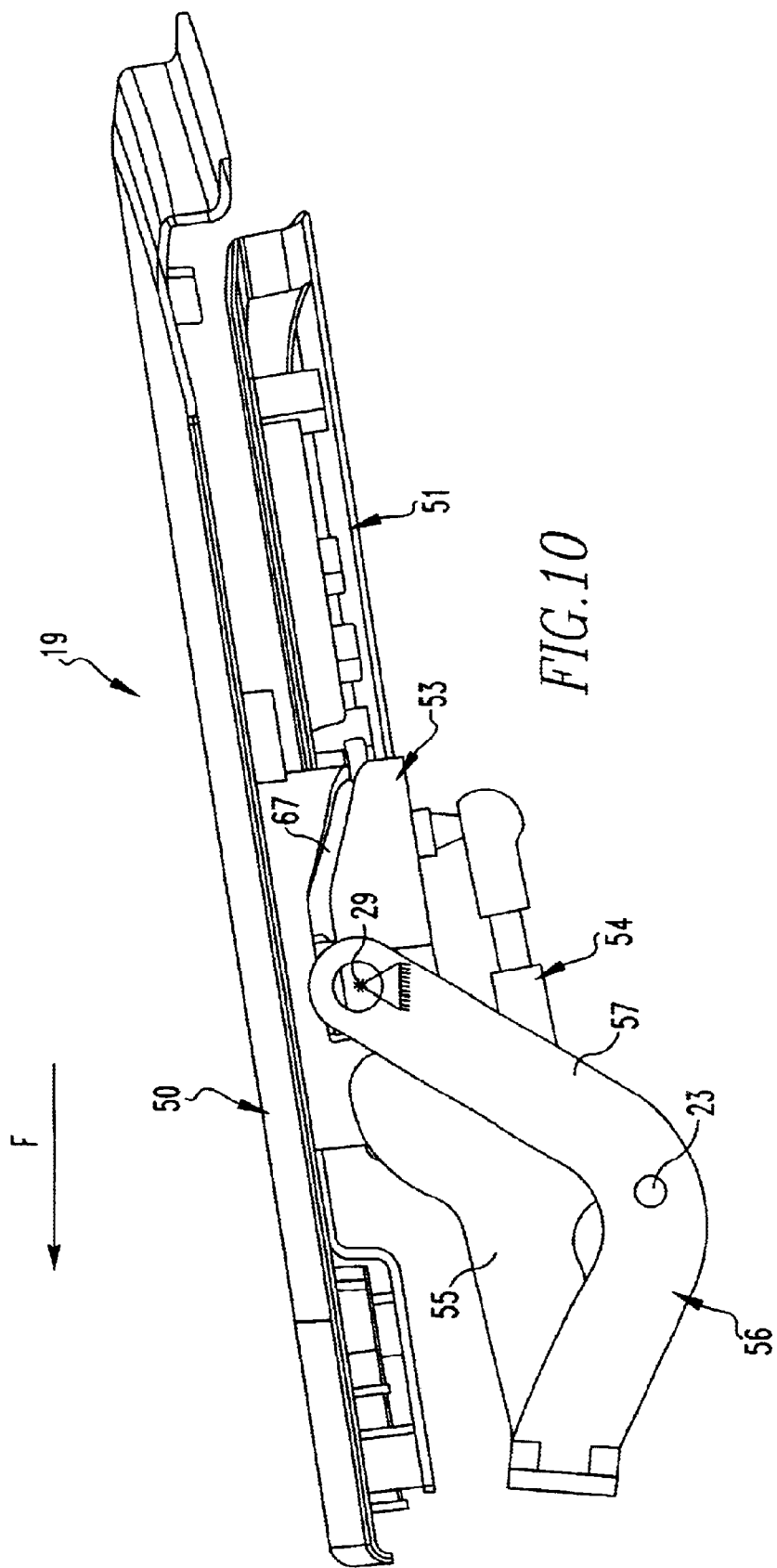
FIG. 10 shows, with respect to the position of the cover according to FIG. 2, a section, wherein the cover is shown with the side parts pivoted under the center part. The control and operating mechanism are also visible.
Figure 11:
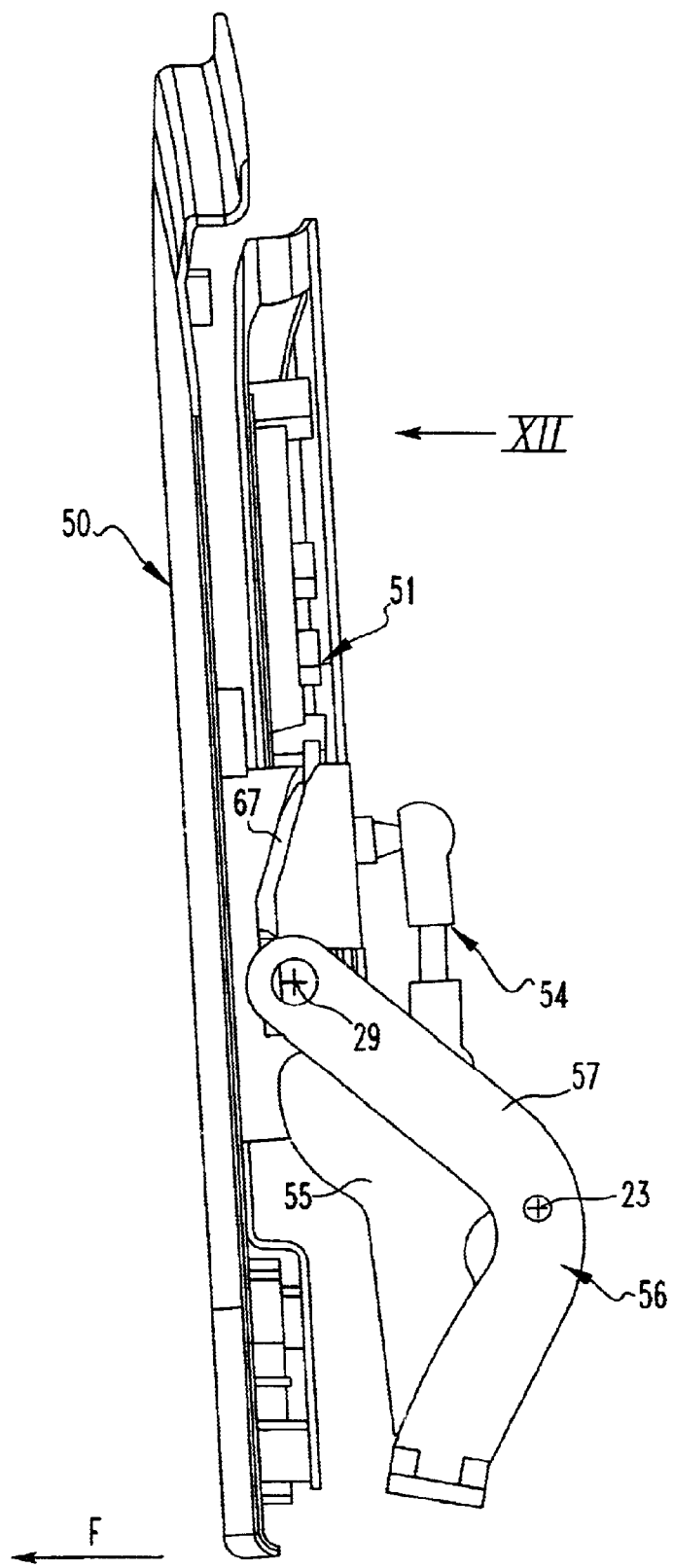
FIG. 11 shows another partial representation of the cover of FIG. 10 now in its maximum open position according to FIG. 6 with the roof deposited in the storage compartment.

Generally, in a multi-part embodiment as shown in FIG. 10 ff., the cover 19 is operated in the same manner as it is done for a one-part cover shown in the earlier figures. Additionally, however, an operating mechanism for the side parts 51 is provided which is based on the operating mechanism for the center part 50.

Figure 16:
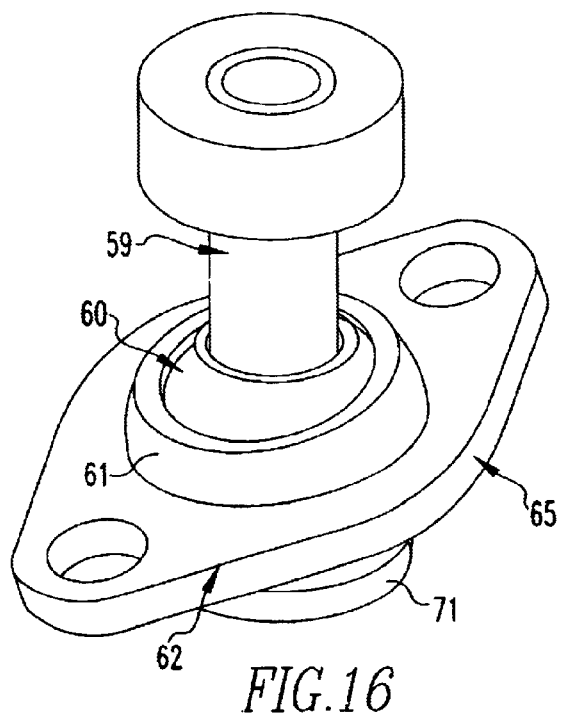
FIG. 16 is an exemplary representation of a joint as used for connecting the side parts to the center part of the cover.

Based on FIG. 10 first the basic arrangement will be described. The side parts are pivoted in this representation under the center part 50 in closely spaced relationship therewith. They extend about parallel to the center part and are connected to the center part by a joint 53. This joint 53 is for example a ball joint as shown in FIG. 16 and a slot guide structure is provided. By way of this joint 53, the respective side part 51 may be actuated by a drive, which is connected to the joint part 65 connected to the respective side part 51.

This drive comprises a support arm for example in the form of a support rod with pivotable end connections. The end connection remote from the joint 53 of the support arm 54 is linked to an operating arm 55, which, in the shown embodiment, is part of a multi-arm lever 56. The multi-arm lever 56 is supported, by way of another arm 57 thereof, by the vehicle body in the area of the pivot axis 29, preferably co-axially with the pivot axis 29 of the lever 26 of the rear guide linkage 18. Upon movement of the roof 2 from the closed position to the storage position in the roof storage compartment 7 the guide linkage 18 is transferred from a forwardly extending folded arrangement (FIG. 2) to a rear extended arrangement. In addition to being pivotally supported by the vehicle body 1 (pivot axis 29) the other arm 57 is connected in the area of the second control point 23, preferably co-axially therewith, to the console 21 or respectively, the lever 26 of the rear guide linkage 18, so that the multi-arm lever 56 is stationary with respect to the roof 2 when disposed in the roof storage compartment.

With respect to the stationary storage position of the roof 2 the cover 19 pivots, as shown in FIGS. 6 to 9, after the release of the pin 33 from the catch 32 about the second control point 23 so that the cover 19, that is, the center part 50 and the side parts 51 are displaced. In the process, the side parts 51, which are connected to the operating arm 55 by way of the support arm 54 of the multi-arm lever 56 are pivoted with respect to the center part 50. This provides for an outward tilting of the side parts 51 into a full cover position adjacent the center part 50, when the center part 50 moves in a direction opposite to the driving direction F since, with the roof stationary in the roof storage compartment and the lever 56 held stationary, the longitudinal movement of the center part 50 in a direction opposite to the driving direction is converted, by way of the support arm 54, into a corresponding pivoting of the joint half carrying the respective side part 51.

Upon closing of the roof, the movement of the side parts 51 is correspondingly reversed. The movement of the center part 50 in driving direction, starting out from the position as shown in FIG. 9, toward the open position as shown in FIG. 6 first result in a pivoting of the side parts 51 below the center part 50. Then, that is, after the pin 33 is locked in the catch member 32, the lever 56 pivots toward the center part 50 since the lever 56 with its arms 55 and 57 is now stationary with respect to the console 21. The side parts 51 and the center part 5 forming the cover 19 are now moved together, that is without any relative position change, into the forward cover position as shown in FIG. 2, in which the side parts 51 are pivoted below the center part 50.

FIG. 16 shows schematically the core section of the joint 53, which is provided with a stationary guide cylinder 58, which, like the joint 53 by means of the guide lug 59, is connected to the center part 50 and which is disposed co-axially with the guide lug 59 of the joint 53. The guide lug 59 extends through a ball joint 60, which is axially movably supported on the guide lug 59 and which is contained in a ball socket 51 mounted, for example by a mounting flange 62, to the respective side part 51. To this joint, which is connected to the side part 51, the support arm 54 is connected preferably by way of a universal joint wherein the support arm 54 extends preferably in the longitudinal vehicle direction corresponding to the direction of movement of the cover 19. However, the support arm may also be connected directly to the side part 51.

Figure 15:
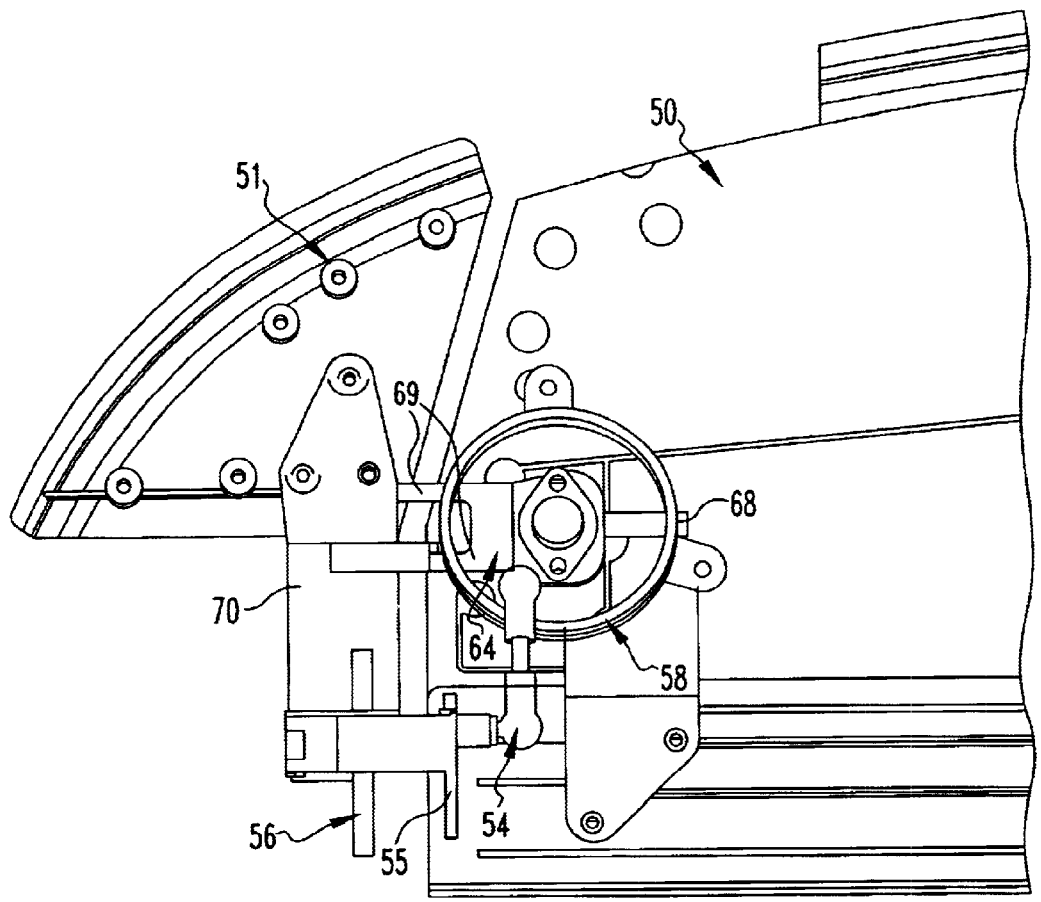
FIG. 15 shows the cover according to FIG. 13 from the bottom corresponding to arrow XV in FIG. 4.
Figure 17:
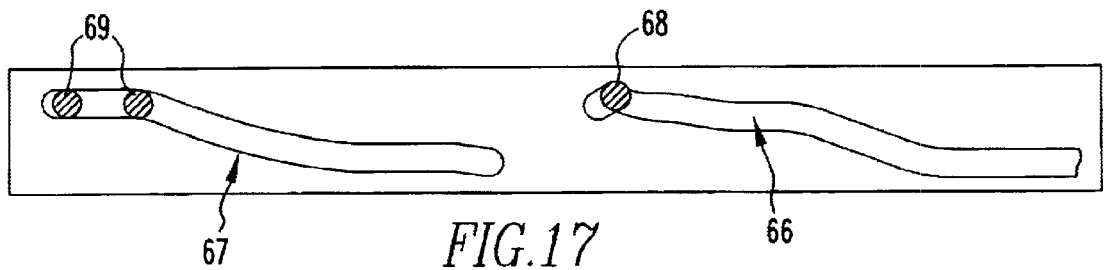
FIG. 17 shows the joint guide structure, which is schematically shown in FIG. 16 by a slot guide in a planar representation.

The connection of the respective side part 51 to the joint 53 occurs—as shown for example in FIG. 15—preferably by way of an extension 64, which extends through the guide cylinder 58 and is connected to the joint part, which is movably supported by the guide lug 59 and connected to the side part 51 and which is designated overall by the reference numeral 65. The support arm 54 is preferably attached to this joint part 65. The extension 64 passes through the guide cylinder 58 by way of a guide slot structure, which preferably comprises two guide slots 66 and 67 which are arranged, with respect to the joint axis, diametrically opposite each other. They are shown in FIG. 17 in a developed projection. The extension 64 is supported in the slot guide structure 66, 67 preferably in such a way that in one guide slot, that is the guide slot 67, only a translatory displacement of the extension arms 69 occurs, while in the other guide slot, that is the guide slot 66, the guide arm 68 is laterally movable and also rotatable. To this end, the extension arm 68 is formed preferably by a guide finger (in the slot 66) of cylindrical cross-section whereas the other the extension part 69 is formed by two circumferentially spaced guide fingers (in the guide slot 67). The guide fingers are preferably so arranged with respect to each other that the guide fingers of the extension arm 69, which permit only lateral displacement are disposed symmetrically with respect to an axial plane including the guide finger of the opposite extension arm 68.

Figure 12:
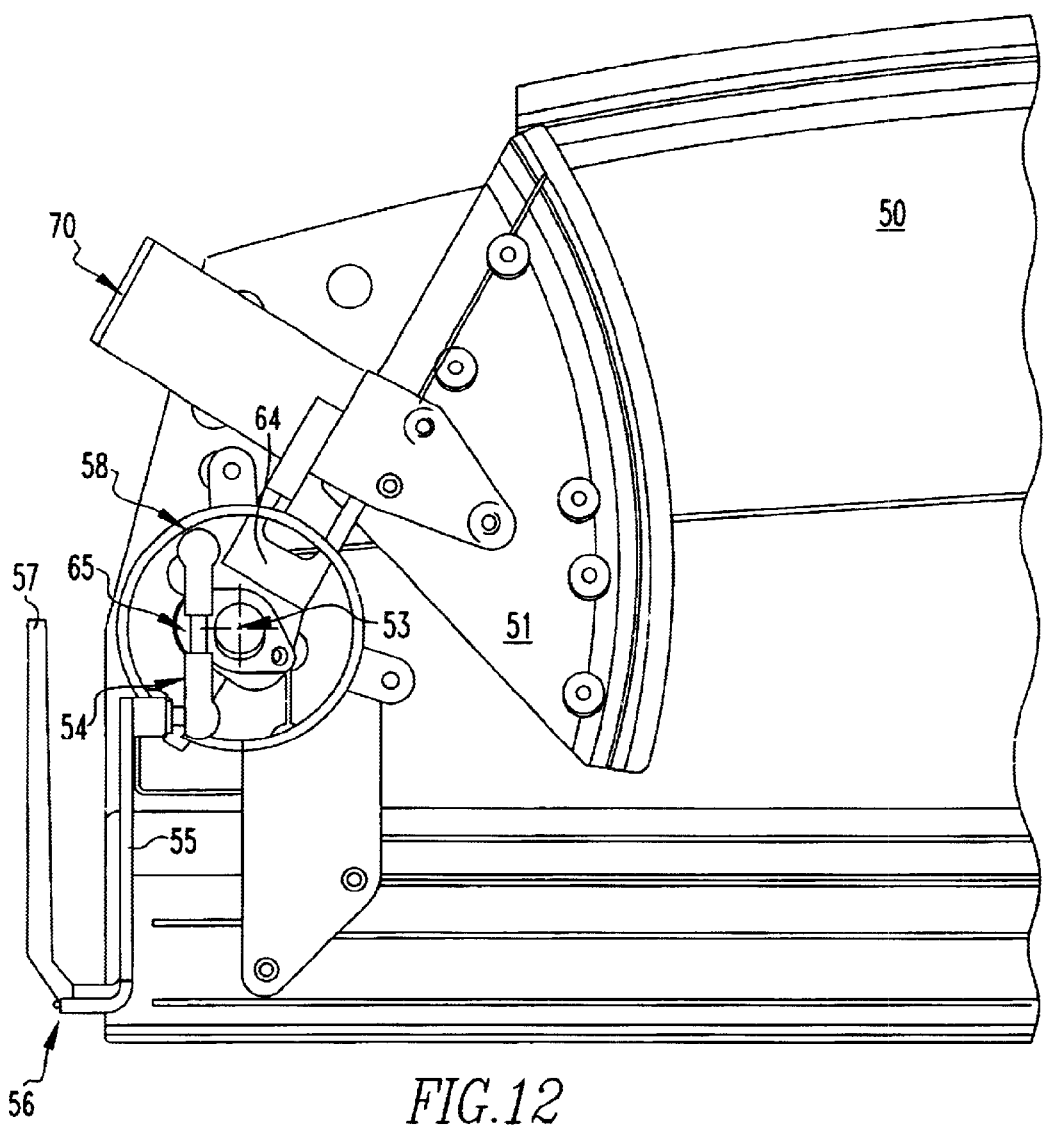
FIG. 12 is a rear view of the arrangement as shown in FIG. 11 seen in the direction of the arrow XII in FIG. 11.
Figure 13:
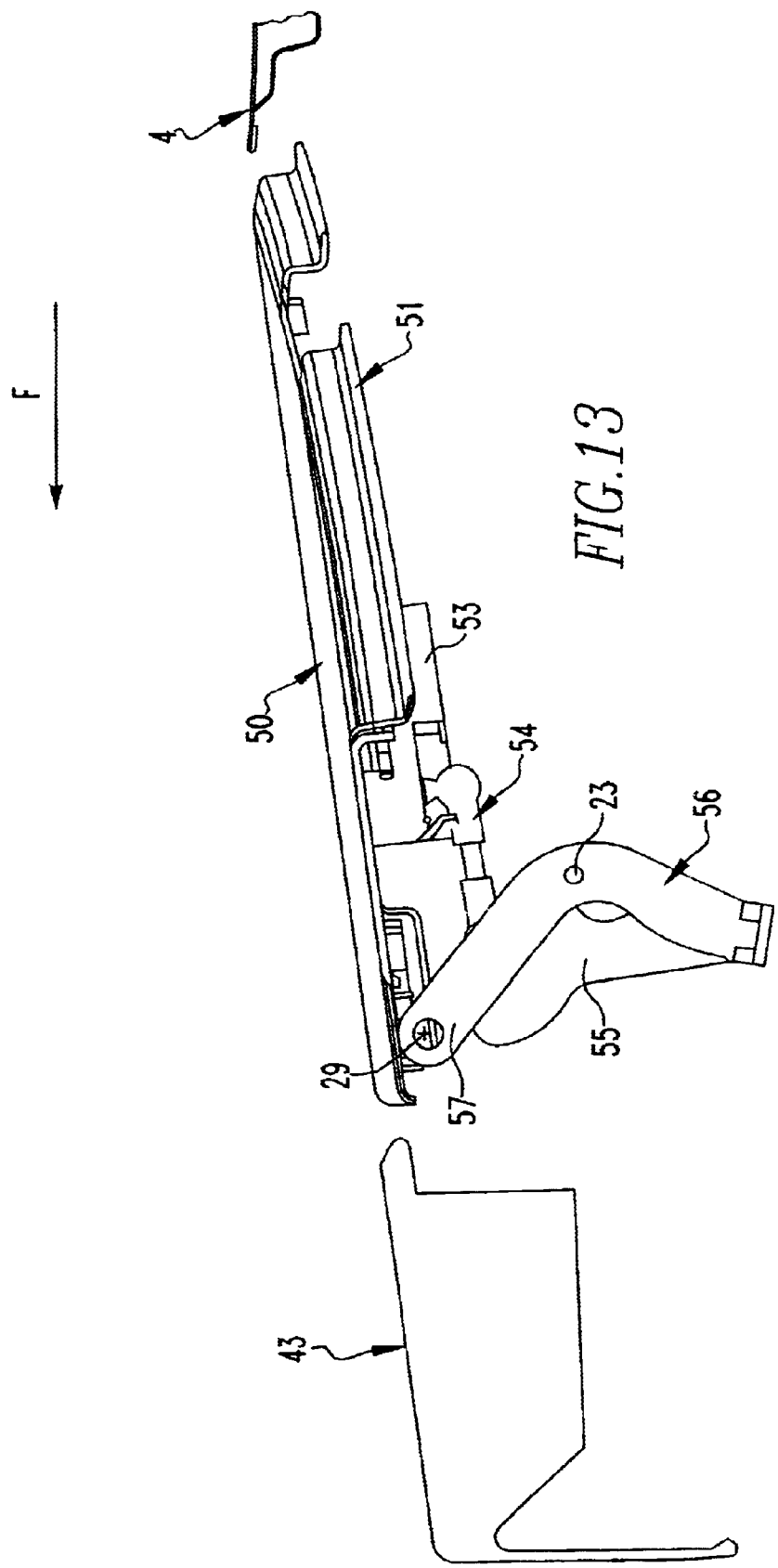
FIG. 13 is a partial view of the cover in a closed position with the roof deposited in the storage compartment according to FIG. 9.
Figure 14:
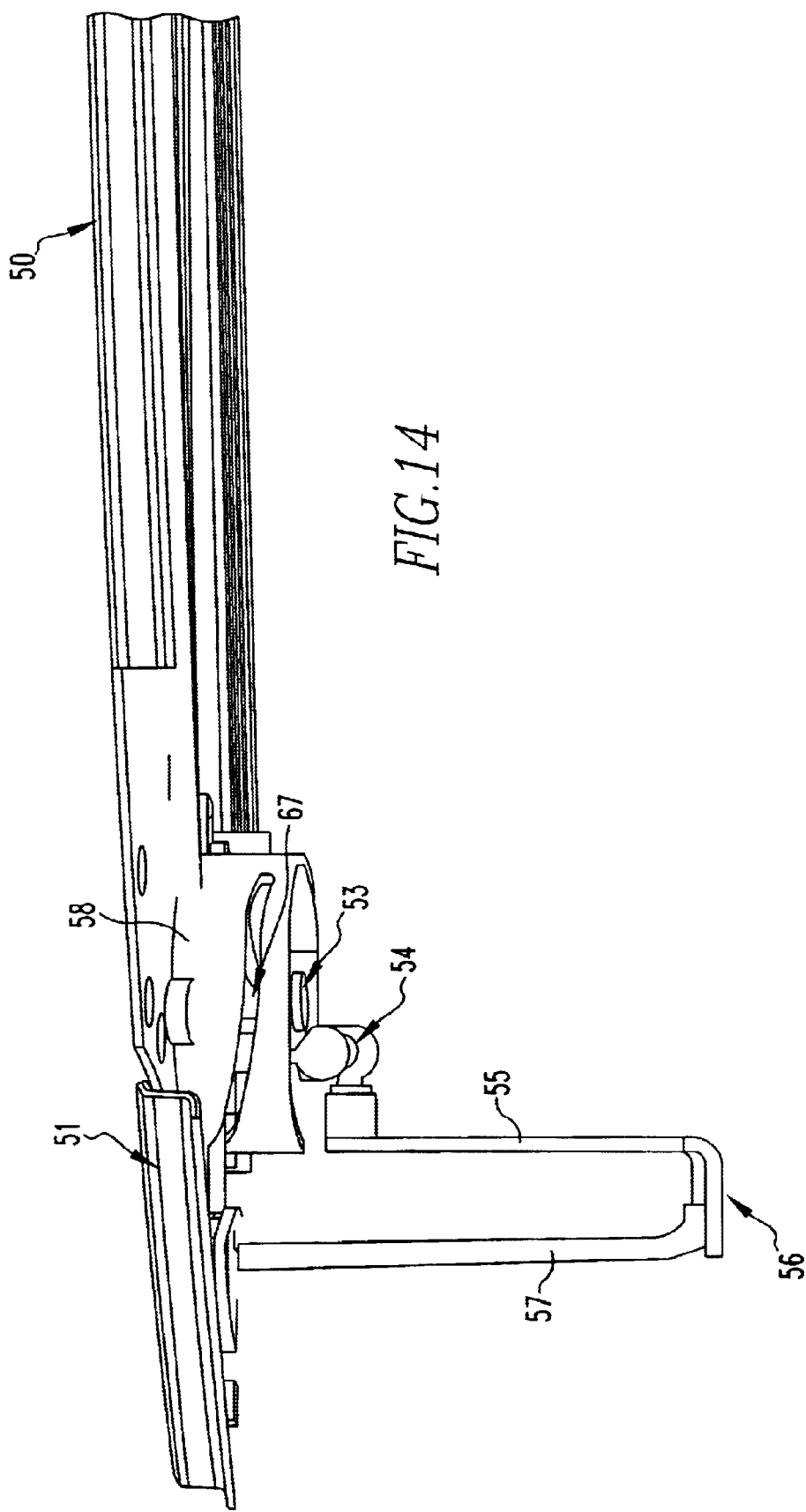
FIG. 14 shows the cover according to FIG. 13 viewed in the driving direction.

This arrangement of the guide structure permits the control of the respective side part 51 as to its height and planar position relative to the center part 51 depending on the respective pivot angle. The wobble joint 53 used in connection with the arrangement of the guide slots 66, 67 provides, because of the given rotational degrees of freedom, the possibility, to join the center part 50 and the side parts 51 in the outwardly pivoted position of the side parts 51 without requiring excessive gaps between the side parts 51 and the center part 50. Particularly small gaps can be achieved if additionally the lug 59 permits axial displacement so that, in combination with a corresponding arrangement of the guide slots, the side parts 51 can be pivoted relative to the center part 50 also with tight gap dimensions in a contact-free manner and, with the side parts pivoted outwardly, the side parts and the center part are smoothly joined. To this end it is advantageous, if the joint part 65 attached to the side part 51 is axially resiliently supported, particularly biased by a spring toward the end position of the joint 53 corresponding to the outward pivot position of the side part, which is in the shown embodiment the upper end position. It is expedient herefor to provide a spring between the lower stop collar 71 of the guide lug 59 and the joint part 65, particularly the ball socket 61. The views of FIGS. 12 and 15 show that the side parts 51, which have an essentially triangular shape in the shown embodiment, join the center part 50 at a rear side section thereof with respect to the vehicle drive direction. However, the figures show also that, toward the front, the side parts 51 may be provided with extensions 70, which are disposed adjacent the center part 50 and which have only support functions. They may also have additional cover functions. In the embodiment as shown, the extensions 70 are disposed in overlapping relationship with the multi-arm lever 56 when the side parts 51 are pivoted outwardly such that the levers 56 form additional supports for the side parts 51 in the outwardly pivoted position or they may be employed as stops for the side parts 51.

FIG. 3 has not been included to show the position-correct coordination of the various levers, arms and joints of the operating mechanism for the roof and the cover according to FIGS. 2 and 4 to 9, but rather to show their functional cooperation. Accordingly, the size relationships as shown in this figure are not according to scale and the position of the parts relative to each other is not in accordance with their design positions.

What is claimed is:

1. A multi-part cover for a storage space of a roof in the rear of a vehicle, said multi-part cover comprising a center part and side parts disposed in a transverse vehicle direction adjacent said center part and having, in the longitudinal vehicle direction, different end positions for the open and closed positions of said roof, and a common operating mechanism for actuating the side parts and the center part of said cover depending on the position of said roof, said sides parts being coupled to said center part such that, upon forward movement of said center part toward its forward end position with the roof closed, said side parts are pivoted below the center part, said side parts being pivotally supported on said center part, and said operating mechanism for said roof and for said cover being a common operating mechanism with a drive connection extending between a roof operating linkage and a cover operating linkage which are joined by a coupling, said roof operating linkage being uncoupled from said cover operating linkage when said roof is disposed in said rear storage space so as to release the cover operating linkage from said roof operating linkage when said roof is disposed in said storage space for permitting longitudinal movement of said center part into an end position in which it covers the roof in said storage space and pivoting the side parts outwardly from said center part of said cover.

2. A multi-part cover according to claim 1, wherein release of the operating mechanism for the longitudinal movement of said center part of said cover is accomplished by said roof being deposited in a rest position in said storage space.

3. A multi-part cover according to claim 1, wherein said center part of said cover is supported so as to be pivotable with respect to the roof operating mechanism about different pivot axes which are disposed at the same side of, but at different distances from, the plane in which said center part is disposed, the pivot axis being disposed at a greater distance from said plane forming a stationary axis when said roof is deposited in said storage space and said center part being pivotable about said one axis for movement thereof longitudinally into a position in which it covers said roof deposited in said storage space.

4. A multi-part cover according to claim 1, wherein each of said side parts is connected to said center part by a joint having a joint part mounted to said center part and the other joint part being supported by the roof deposited in said storage space.

5. A multi-part cover according to claim 4, wherein said side parts are pivoted relative to said center part by longitudinal displacement of said center part.

6. A multi-part cover according to claim 5, wherein said joint part mounted on said center part includes guide means controlling the position of said side parts depending on the pivot angle of said side parts relative to said center part.

7. A multi-part cover according to claim 6, wherein said guide means control the positions of said side parts relative to said center part with respect to the angular position relative to the center part and the level of the side parts relative to the center part.

8. A multi-part cover according to claim 6, wherein said joint includes a guide lug which is stationary with respect to said center part and which is surrounded by a guide structure including radially opposite guide slots for controlling the movement of said side parts relative to said center part.

9. A multi-part cover according to claim 8, wherein said guide structure is a stationary guide cylinder disposed around said guide lug.

10. A multi-part cover according to claim 8, wherein said joint part supported by said roof is connected to said guide lug by a ball joint.

11. A multi-part cover according to claim 10, wherein said joint supported by said roof is supported on said lug so as to longitudinally movable thereon.

12. A multi-part cover according to claim 10, wherein said joint part supported on said roof includes opposite guide members extending into the guide slots at opposite sides of said lug.

13. A multi-part cover according to claim 12, wherein, of said guide members, a first guide member is slidable and rotatable in its guide slot and a second guide member at the opposite side if only slidably supported in its guide slot.

14. A multi-part cover according to claim 13, wherein said first guide member, which is slidably and rotatably supported in said guide slots, is in the form of a cylindrical guide finger.

15. A multi-part cover according to claim 14, wherein said second guide member is in the form of a guide fork.

16. A multi-part cover according to claim 15, wherein said guide fork has two fork arms disposed symmetrically at opposite sides of a plane extending through the axis of said lug and said cylindrical guide finger.

17. A multi-part cover according to claim 4, wherein said joint part is supported on said roof in said storage space by an operating arm, which is connected to said joint by way of a support arm.

18. A multi-part cover according to claim 17, wherein said operating arm is part of a support structure supporting said side part in an outwardly pivoted position.

19. A multi-part cover according to claim 17, wherein said operating arm is part of a stop structure for the side part in its outwardly pivoted position.

* * * * *